US007486295B2

(12) United States Patent
Russ et al.

(10) Patent No.: US 7,486,295 B2
(45) Date of Patent: Feb. 3, 2009

(54) PICKWALKING METHODS AND APPARATUS

(75) Inventors: Robert Russ, Richmond, CA (US); Christopher King, Berkeley, CA (US); Maxwell O. Drukman, San Francisco, CA (US); Malcolm Blanchard, Glen Ellen, CA (US); Marco Da Silva, Oakland, CA (US); Tom Hahn, Piedmont, CA (US); Karon A. Weber, San Francisco, CA (US)

(73) Assignee: Pixar, Emeryville, CA (US)

( * ) Notice: Subject to any disclaimer, the term of this patent is extended or adjusted under 35 U.S.C. 154(b) by 25 days.

(21) Appl. No.: 10/846,155

(22) Filed: May 14, 2004

(65) Prior Publication Data

US 2005/0253845 A1    Nov. 17, 2005

(51) Int. Cl.
    *G06T 13/00*    (2006.01)
(52) U.S. Cl. ...................................... 345/473
(58) Field of Classification Search ................ None
    See application file for complete search history.

(56) References Cited

U.S. PATENT DOCUMENTS

| 5,056,031 | A | * | 10/1991 | Nakano et al. ............. 701/301 |
| 5,852,450 | A | * | 12/1998 | Thingvold ................. 345/473 |
| 6,823,299 | B1 | * | 11/2004 | Contreras et al. ............ 703/14 |
| 6,898,560 | B1 | * | 5/2005 | Das ............................... 703/7 |

\* cited by examiner

*Primary Examiner*—Ulka Chauhan
*Assistant Examiner*—Said Broome
(74) *Attorney, Agent, or Firm*—Townsend and Townsend and Crew LLP

(57) ABSTRACT

A method for an animation environment includes displaying a first geometric object on a display, wherein the first geometric object comprises a plurality of geometric components, wherein the plurality of geometric components are coupled according to a geometric hierarchy, wherein the plurality of geometric components includes a first geometric component and a second geometric component, and wherein the first geometric component and the second geometric component are not adjacent within the geometric hierarchy, receiving a selection signal from a user, selecting the first geometric component in response to the selection signal, receiving a navigation signal from the user, and selecting the second geometric component in response to the navigation signal by traversing an animation hierarchy, wherein the first geometric component and the second geometric component are adjacent within the animation hierarchy.

18 Claims, 6 Drawing Sheets

PICKWALKING METHODS AND APPARATUS

CROSS-REFERENCES TO RELATED APPLICATIONS

The present invention is related to and incorporates by reference for all purposes U.S. Pat. No. 7,221,380, filed May 6, 2004, titled "Integrated Object Bend, Squash And Stretch Methods and Apparatus," and U.S. Provisional Patent Application No. 60/571,334, filed May 14, 2004, titled "Review Sketch Methods and Apparatus".

BACKGROUND OF THE INVENTION

The present invention relates to computer animation. More specifically, the present invention relates to enhanced user interfaces for object animation.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and Academy-Award® winning rendering software known as Render-Man®.

Over the years, Pixar has also developed software products and software environments for internal use allowing users (modelers) to easily define object rigs and allowing users (animators) to easily animate the object rigs. Based upon such real-world experience, the inventors of the present invention have determined that additional features could be provided to such products and environments to facilitate the object definition and animation process.

Traditionally, three-dimensional objects are a collection of sub-objects (components) connected in a manner defined by the modelers. More specifically, these components are connected in a manner specified by an object hierarchy. As an example, FIGS. 1A-B illustrates representations 100 and 105 of a typical object hierarchy. In this example, the hips 110 are defined as the root component, with three branches (children), as shown: torso 120, left leg 130, and right leg 140. In turn, torso 120 has a single branch to the chest 150, and chest 150 has three sub-branches, neck 160, left shoulder 170, and right shoulder 180. In turn, each of these three branches includes child nodes. As shown, right shoulder 180 and left shoulder 170 are coupled via chest 150. Additionally, as shown, a left hand 190 and a right hand 195 are shown. Previously, the object and the object hierarchy were provided to animators for use in the animation process without input from the animators.

The inventors have recognized that drawbacks to the above method includes that if an animator is setting values for an object, such as right hand 195, and wants to set a value for left hand 190, there is no simple way for the user to move from selecting right hand 195 to selecting left hand 190. For example, in FIG. 1, the user must traverse up object hierarchy 100 from right hand 195 to chest 150, and then navigate down and select left hand 190. Such navigation was time consuming.

In light of the above, the inventors of the present invention have determined that improved user interfaces and methods are desired.

BRIEF SUMMARY OF THE INVENTION

The present invention relates to computer animation. More specifically, the present invention relates to enhanced user interfaces for object manipulation environments.

The present embodiments disclose apparatus, methods and user interfaces for a navigation network based on the visual, physical characteristics of an object model. One of the philosophies of the present invention is to provide a network of arbitrary connections between components of an object that make visual sense. The components may be interconnected via one or more hotkeys, or the like, that allow the user to quickly create and modify component selections, as well as to quickly navigate the network.

In various embodiments, the custom hierarchies are typically independent from the hierarchies used by other users, for example, a geometric hierarchy for the object defined and used by a user (e.g. modeler) in an object creation environment will typically be different from an animation hierarchy for the object defined and used by a user (e.g. animator) in an animation environment. For instance, the geometric hierarchy used by a modeler may describe that a right hand is directly connected to a right elbow and to a finger of the right hand; in contrast, the animation hierarchy used by an animator may describe that the right hand is also directly connected to the left hand.

The present embodiments also disclose apparatus, methods and user interfaces for allowing users to traverse such custom hierarchies. In various embodiments, the hierarchies may be logically represented by a state machine, with states representing the selection of an object component, and with user entries being the conditions for changing from one state to another. For example, in a case where the right hand is selected, within the animation hierarchy, an up arrow will cause the right elbow to be selected; a down arrow will cause a finger on the right hand to be selected; a right or a left arrow will cause the left hand to be selected; and the like. In various embodiments, the user entry may be a click of a button on a mouse or a stylus, a keystroke on a keyboard, a voice command, a gesture, or physical interaction with a possible physical device (e.g. a jointed, wooden armature) and the like.

According to one aspect of the invention, a method for a computer system is disclosed. A technique may include displaying a first geometric object on a display, wherein the first geometric object comprises a plurality of geometric components, wherein the plurality of geometric components are coupled according to a geometric hierarchy, wherein the plurality of geometric components includes a first geometric component and a second geometric component, and wherein the first geometric component and the second geometric component are not adjacent within the geometric hierarchy. Additionally, a process may include receiving a selection signal from a user, selecting the first geometric component in response to the selection signal, and receiving a navigation signal from the user. Various methods may also include selecting the second geometric component in response to the navigation signal by traversing an animation hierarchy, wherein the first geometric component and the second geometric component are adjacent within the animation hierarchy.

According to one aspect of the invention, an animation system is disclosed. One system includes a memory configured to store a geometric model of an object, wherein the geometric model comprises a plurality of geometric components, wherein the memory is configured to store a first configuration hierarchy for the plurality of geometric components, wherein the memory is configured to store a second configuration hierarchy for the plurality of geometric components, wherein the first configuration hierarchy specifies a first geometric component and a second geometric component are not adjacent, wherein the second configuration hierarchy specifies the first geometric component and the second geometric component are adjacent. Various apparatus includes a processor coupled to the memory, wherein the processor is configured to receive a selection signal from the user, wherein the processor is configured to select the first geometric component in response to the selection signal, wherein the processor is configured to receive a navigation signal from the user, wherein the processor is configured to select the second geometric component in response to the second configuration hierarchy and in response to the navigation signal. A device may also include a display coupled to the processor, wherein the display is configured to output an indication that the first geometric object has been selected, and wherein the display is configured to output an indication that the second geometric object has been selected.

According to one aspect of the invention, a computer program product for a computer system including a processor and display is disclosed. The computer program product may include code that directs the processor to display a representation of an object on the display, wherein the object is specified as a plurality of components coupled according to a first hierarchy, wherein the plurality of components of the object are also coupled according to a second hierarchy, code that directs the processor to receive a selection signal from a user, and code that directs the processor to highlight a first component from the plurality of components on the display in response to the selection signal. The computer program product may also include code that directs the processor to receive a navigation signal from the user, and code that directs the processor to highlight a second component from the plurality of components on the display in response to the second hierarchy and in response to the navigation signal. The codes typically reside on a tangible media such as a magnetic media, optical media, semiconductor media, or the like. In various cases, the first component and the second component are not directly connected in the first hierarchy, and the first component and the second component are directly connected in the second hierarchy.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 2:
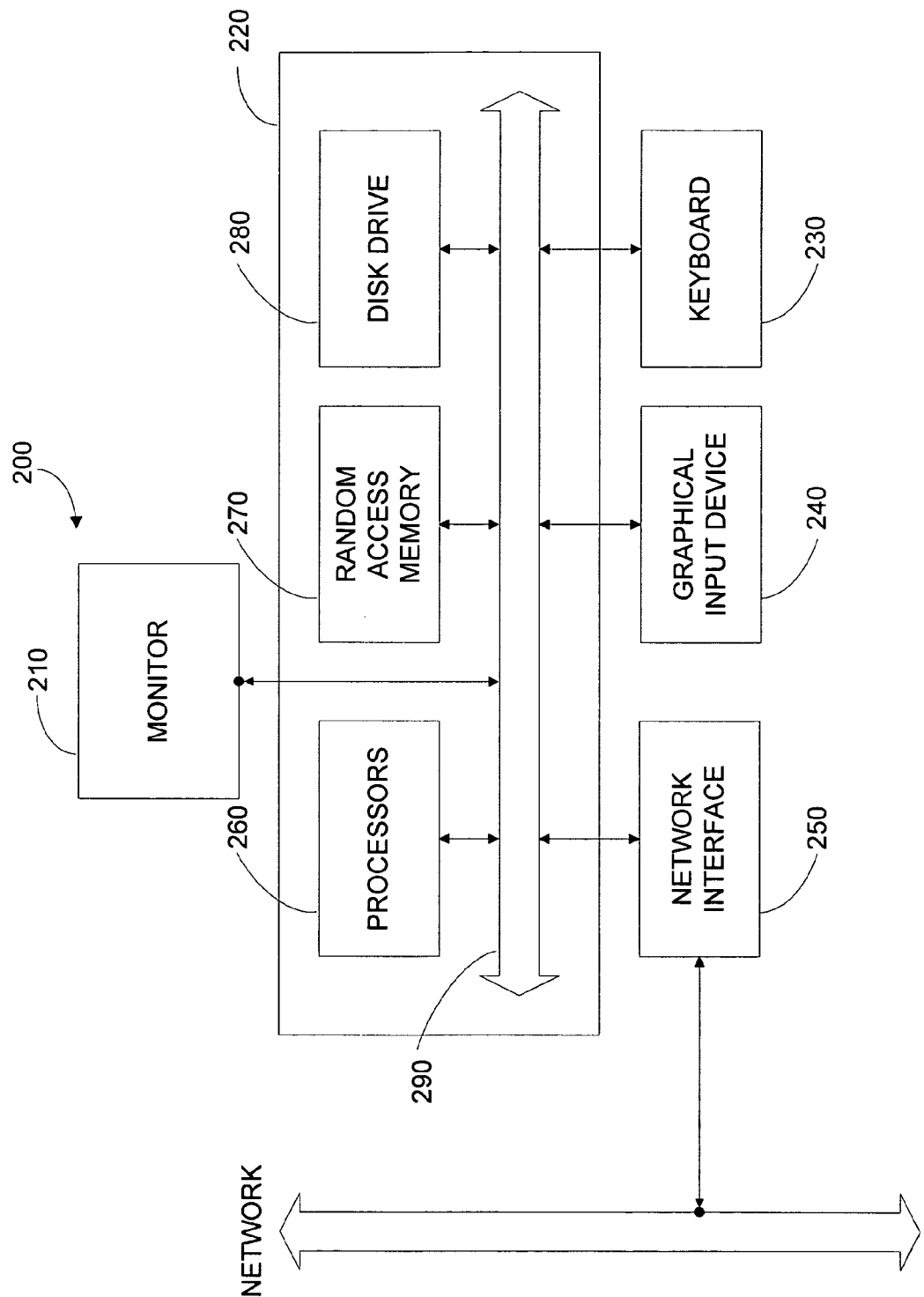
FIG. 2 is a block diagram of typical computer system 200 according to an embodiment of the present invention.

FIG. 2 is a block diagram of typical computer system 200 according to an embodiment of the present invention.

In the present embodiment, computer system 200 typically includes a monitor 210, computer 220, a keyboard 230, a user input device 240, a network interface 250, and the like.

In the present embodiment, user input device 240 is typically embodied as a computer mouse, a trackball, a track pad, a joystick, wireless remote, drawing tablet, an integrated display and tablet (e.g. Cintiq by Wacom), voice command system, eye tracking system, and the like. User input device 240 typically allows a user to select objects, icons, text and the like that appear on the monitor 210 via a command such as a click of a button or the like.

Embodiments of network interface 250 typically include an Ethernet card, a modem (telephone, satellite, cable, ISDN), (asynchronous) digital subscriber line (DSL) unit, and the like. Network interface 250 are typically coupled to a computer network as shown. In other embodiments, network interface 250 may be physically integrated on the motherboard of computer 220, may be a software program, such as soft DSL, or the like.

Computer 220 typically includes familiar computer components such as a processor 260, and memory storage devices, such as a random access memory (RAM) 270, disk drives 280, and system bus 290 interconnecting the above components.

In one embodiment, computer 220 is a PC compatible computer having one or more microprocessors such as Pentium IV™ or Xeon™ microprocessors from Intel Corporation. Further, in the present embodiment, computer 220 typically includes a LINUX-based operating system.

RAM 270 and disk drive 280 are examples of tangible media configured to store data, audio/video files, computer programs, scene descriptor files, object data files, shader descriptors, different component hierarchies for one or more objects, output image files, texture maps, displacement maps, object creation environments, animation environments, asset management systems, databases and database management systems, and the like. Other types of tangible media include floppy disks, removable hard disks, optical storage media such as CD-ROMS, and DVDs, semiconductor memories such as flash memories, read-only-memories (ROMS), battery-backed volatile memories, networked storage devices, and the like.

In the present embodiment, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Further, the use of other micro processors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows®, WindowsXP®, WindowsNT®, or the like from Microsoft Corporation, Solaris from Sun Microsystems, LINUX, UNIX, MAC OS from Apple Computer Corporation, and the like.

Figure 3:
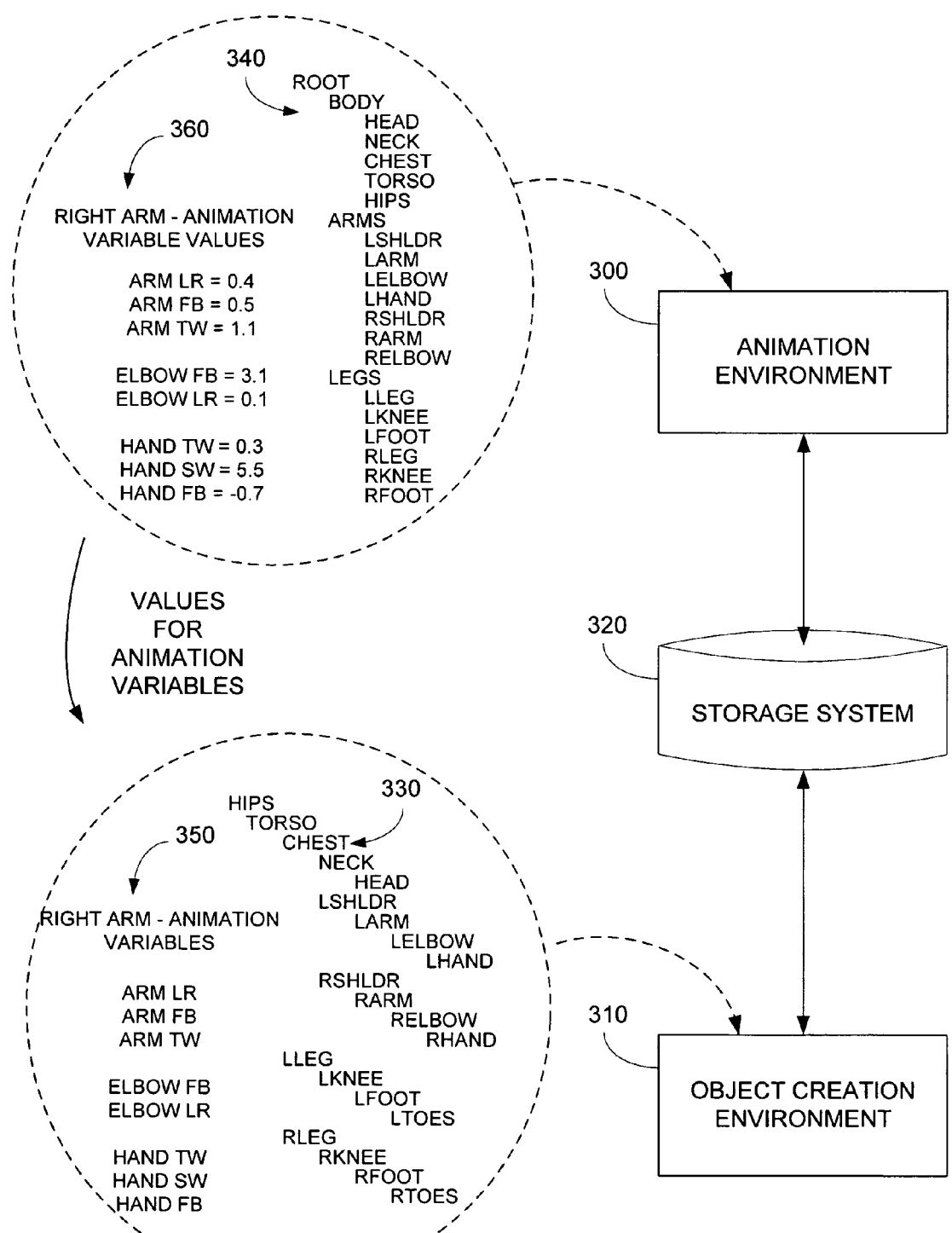
FIG. 3 illustrates a block diagram of an embodiment of the present invention.

FIG. 3 illustrates a block diagram of an embodiment of the present invention. Specifically, FIG. 3 illustrates an animation environment 300, an object creation environment 310, and a storage system 320.

In the present embodiment, object creation environment 310 is an environment that allows users (modelers) to specify object articulation models, including armatures and rigs. Within this environment, users can create models (manually, procedurally, etc.) of other objects (components), and specify how the objects articulate with respect to animation variables (Avars). In one specific embodiment, object creation environment 310 is a Pixar proprietary object creation environment known as "Geppetto." In other embodiments, other types of object creation environments can be used.

In the present embodiment, the object models that are created with object creation environment 310 may be used in animation environment 300. Typically, object models are hierarchically built, and the user (modeler) specifies how the components are interconnected via an object hierarchy 330. The hierarchical nature for building-up object models is useful because different users (modelers) are typically assigned the tasks of creating the different models. For example, one modeler is assigned the task of creating models for an arm, a different modeler is assigned the task of creating models for a face, and the like. Accordingly, by dividing-up the responsibility for object creation, the object creation process time is greatly reduced.

In the present embodiment, animation environment 300 is an environment that allows users (animators) to manipulate object articulation models, via setting of animation variables (Avars). In one embodiment, animation environment 300 is a Pixar proprietary animation environment known as "Menv," although in other embodiments, other animation environments could also be adapted. In this embodiment, animation environment 300 allows an animator to manipulate the Avars provided in the object models (generic rigs) and to move the objects with respect to time, i.e. animate an object.

Additionally, in the present embodiment, animation environment 300 supports the use of an object hierarchy, that may be different from the hierarchy used by the object modelers. For example, within animation environment 300 an object hierarchy 340 may specify the direct connection between components not directly connected in object hierarchy 330.

In other embodiments of the present invention, animation environment 300 and object creation environment 310 may be combined into a single integrated environment.

In FIG. 3, storage system 320 may include any organized and repeatable way to access object articulation models. For example, in one embodiment, storage system 320 includes a simple flat-directory structure on local drive or network drive; in other embodiments, storage system 320 may be an asset management system or a database access system tied to a database, or the like. In one embodiment, storage system 320 receives references to object models from animation environment 300 and object creation environment 310. In return, storage system 320 provides the object model stored therein. As illustrated, object models typically specify one or more animation variables 350. In response, via animation environment 300, the user may specify values 360 for animation variables 350 either graphically, via keyboard, or the like.

Figure 4A:
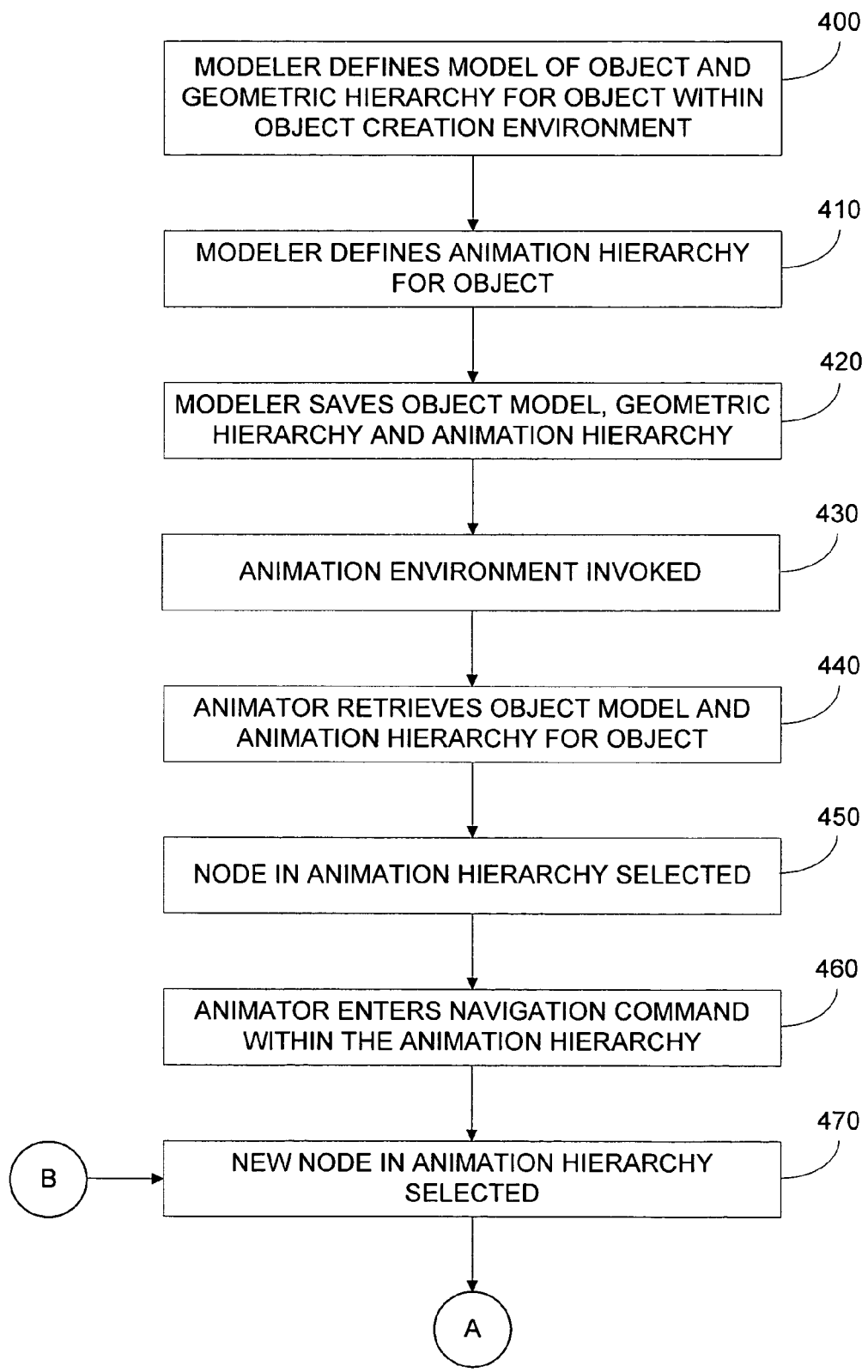
FIGS. 4A-B illustrate a block diagram of a flow process according to an embodiment of the present invention.
Figure 4B:
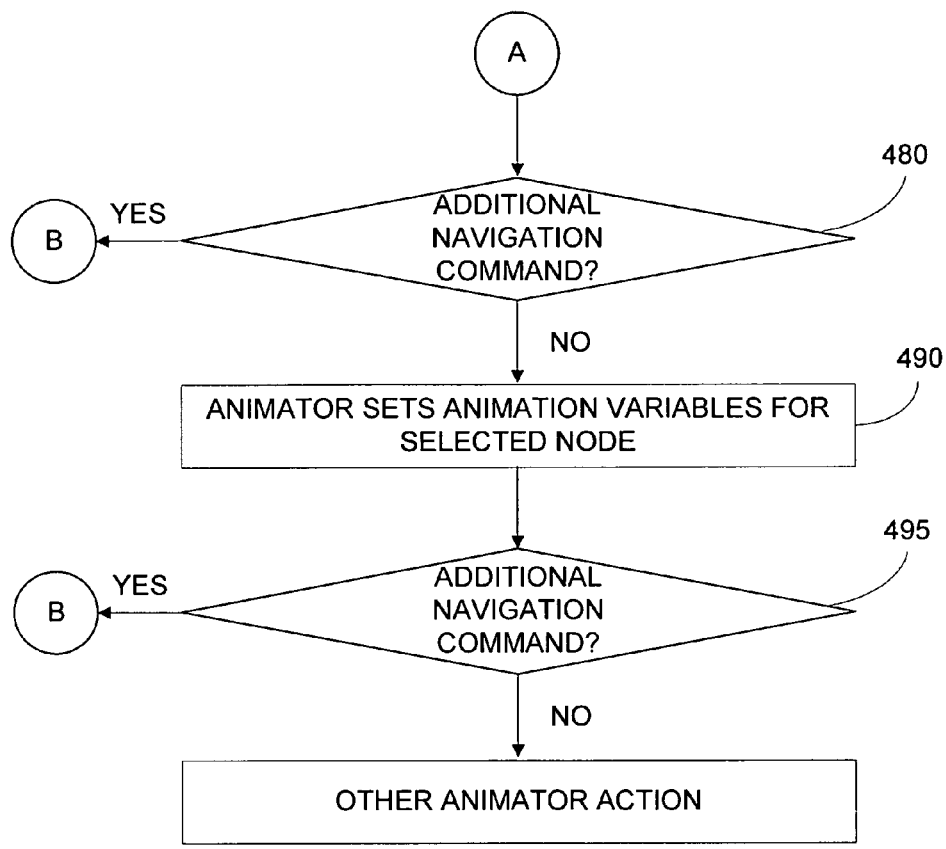

FIGS. 4A-B illustrate a block diagram of a flow process according to an embodiment of the present invention.

Initially, one or more users (e.g. object modelers) creates a model of a three-dimensional object, step 400 in an object creation environment. The specification of the model typically includes a specification of sub-objects or components, interconnected in a first connection hierarchy. Additionally, the user defines animation variables applicable to the components.

Next, in the present embodiment, the user (e.g. object modeler) also defines a second connection hierarchy for the components of the object, step 410. In various embodiments of the present invention, a different user (e.g. an animator, a shader) specifies the interconnections in the second connection hierarchy. The object modeler then implements the specification for the different user. In various embodiments, any number of connection hierarchies may be created for different users and for different uses, for example, types of hierarchies may include a deformer hierarchy, a shading hierarchy, a geometric hierarchy, a animation hierarchy, and the like. In embodiments of the present invention, the different users may directly define the second connection hierarchy, and/or may define the hierarchy on-the-fly (i.e. add interconnections between the components as needed).

In various embodiments, the second connection hierarchy may include the first connection hierarchy and include additional interconnections. In other embodiments, the second connection hierarchy may include only some, or even none, of the same interconnections as the first connection hierarchy. In the present embodiments, the model of the three-dimensional object, the first connection hierarchy and the second connection hierarchy are then saved, step 420.

In embodiments of the present invention, it is contemplated that a first class of users (e.g. object modelers) define a model and implement the custom connection hierarchies, and different class of users (e.g. animators, shaders) use the custom connection hierarchies.

In the example in FIG. 4A, a user (e.g. animator) initiates an animation environment, step 430, and retrieves the object model and the second connection hierarchy, step 440. In other embodiments, the object model and second connection hierarchy may be retrieved within the object creation environment, a shading environment, or the like.

Next, a node in the second connection hierarchy is selected, step 450. In the present embodiment, the node may be a component. For example, the node may be a default component such as the hips, the torso, the right hand, or the like; or the node may be a user selected component. In one embodiment of the present invention, a user may graphically select a component from the connection hierarchy using techniques described in the "Patch Pickable" patent application incorporated by reference above.

In other embodiments, the node may be a node not associated with any component. An illustration of this will be given below.

In other embodiments, the node may be set to a preset node when the user strikes a key. For example, whenever the user strikes the "\" key, a defined node, such as the "torso" component may be selected. In various embodiments, the user may define the node associated with a key strike. For example, when working on setting animation variables for fingers, the user may associate a "wrist" component with a "\" key; when working on facial animation variables, the user may associate a "nose" component with a "\" key, and the like. In still other embodiments, the user may assign multiple keyboard keys, mouse buttons, or the like with different nodes or components. For example, a "a" key may be associated with the "left shoulder" component, an "s" key may be associated with the "torso" component, a "d" key may be associated with the "right shoulder" component, an "e" key may be associated with the "head" component, and the like. In additional embodiments, the key maps may be stored and retrieved for further user.

In the present embodiments, the user then enters a navigation command, step 460. In various embodiments, the navigation command may be a keyboard entry, such as an ASCII character, a function key, or the like. In one particular embodiment, the navigation commands are selection of keyboard arrow keys. In other embodiments, other types of navigation commands are contemplated, such as pressing of buttons on a mouse, a tablet, trackball, etc; moving a joystick, speaking voice commands, manipulating a "scroll" wheel of an input device, making a gesture, or physically manipulating a possible physical device (e.g. a jointed, wooden armature) and the like.

In response to the navigation command, the connection data specified in the second connection hierarchy is used to determine which node is then selected, step 470. For example, if a "left elbow" component was selected in step 450, above, and the "left arrow" button were selected, the "right elbow" component is now selected in the present step. In various embodiments, the second connection hierarchy can be represented as a state machine, with the different states representing the currently selected node or component, and the navigation command being used to move between states. In the present embodiment, it is contemplated that the second connection hierarchy may include connections between components that were not defined in the first connection hierarchy, but are desired by the user (e.g. animator, shader, etc.). In the present embodiment, different components may be selected in response to additional navigation commands, step 480. Detailed examples of this process will be illustrated below.

In various embodiments, a number of conventional modifier keys may be depressed as the same time as the navigation command to select multiple components. For example, pressing the "Shift" key and a navigation command, may result in the original node being selected, and the new node being selected; as another example, pressing the "Control" key and a navigation command may result in the original node being selected, and other child nodes being selected. Many other permutations of key combinations are contemplated in other embodiments, including pressing the "Alt" key, "chording" of mouse input keys, and the like.

In the present embodiment, the user may set an animation variable for the selected component, step 490. In various embodiments, the animation variables may be set by keyboard entry (e.g. numeric value), may be graphically set, for example using graphical widgets to set values as described in the "Bend, Squash and Stretch" patent application mentioned above, and other techniques.

When the user (e.g. animator, user) is satisfied with the values set for the selected component, the user may navigate to other components, again referring to the second component hierarchy, or otherwise, step 495. For example, the user may enter a different manipulation mode for the components, and the like.

Figure 5A:
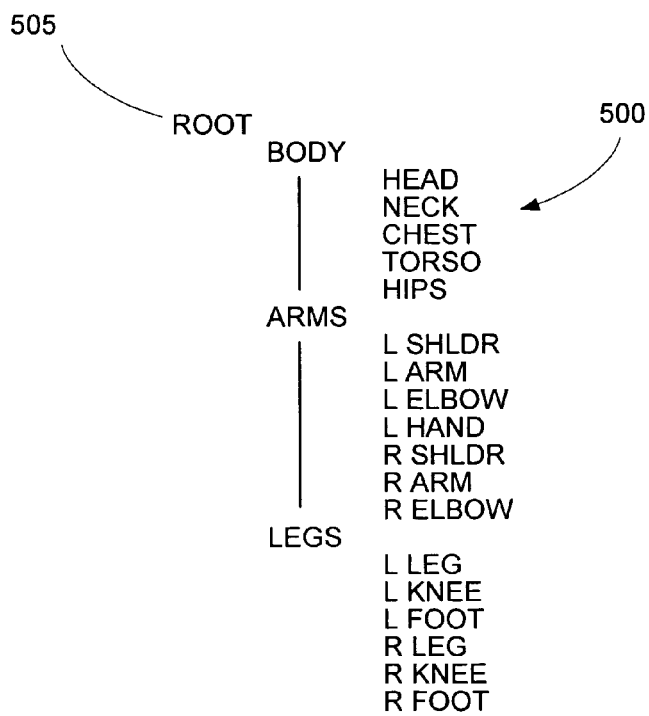
FIG. 5A-B illustrate embodiments according to an embodiment of the present invention.
Figure 5B:
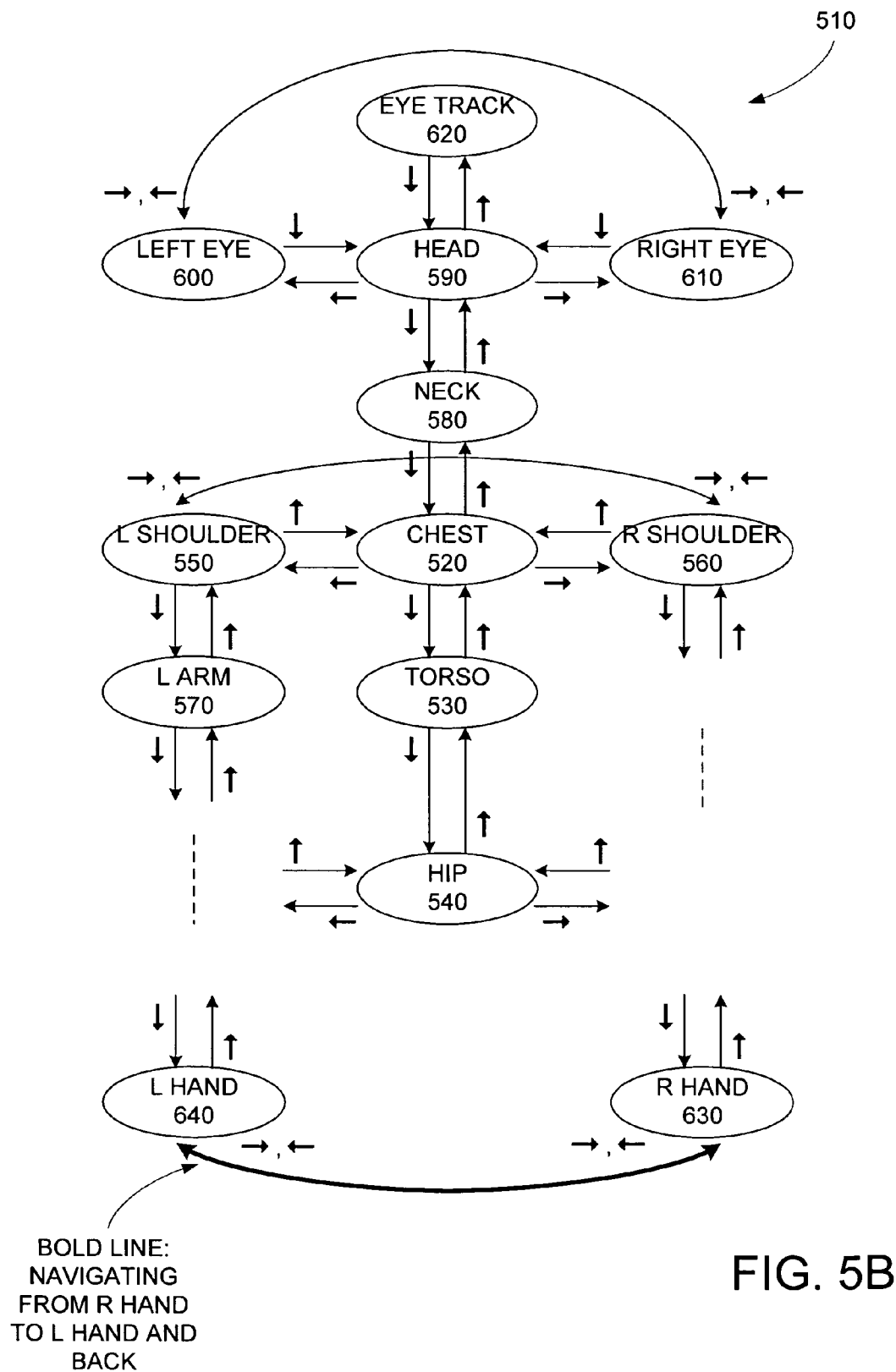

FIGS. 5A-B illustrate embodiments according to an embodiment of the present invention. More specifically, FIG. 5A illustrates an example of a hierarchy 500 provided for an animator, and FIG. 5B illustrates a navigation state diagram 510 associated with hierarchy 500.

Figure 1A:
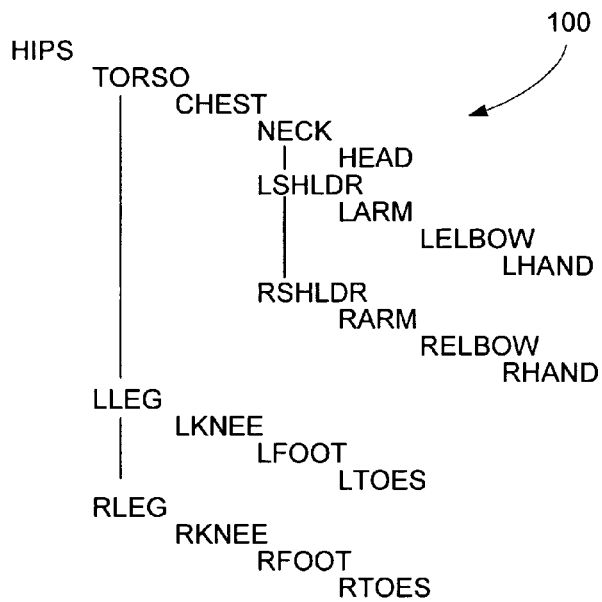
FIG. 1A-B illustrate a typical object hierarchy.
Figure 1B:
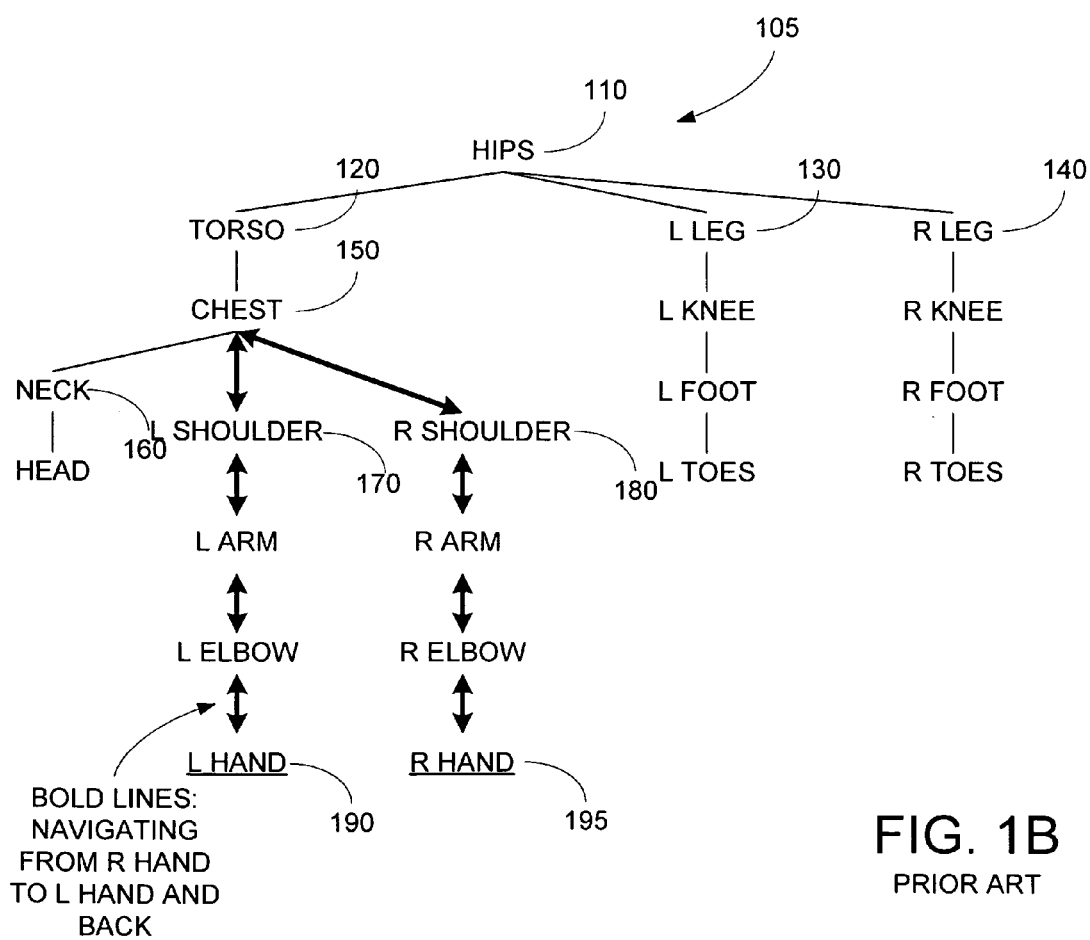

Comparing hierarchy 500 in FIG. 5A to hierarchy 100 in FIG. 1, illustrates that fewer levels of hierarchy are specified in hierarchy 500, accordingly, fewer navigation steps are required to move from component to component. Also illustrated in FIG. 5A is node 505 that is not a physical component but is a root node of hierarchy 500.

FIG. 5B illustrates an example of a portion 510 of a navigation state diagram. In this example, arrow keys serve as the navigation commands. FIG. 5B illustrates a number of components including a chest component 520, a torso component 530, a hip component 540, a left shoulder component 550, a right shoulder component 560, a left arm component 570, a neck component 580, a head component 590, a left eye component 600, a right eye component 610, and a eye tracking mode 620. Also shown are right hand component 630 and left hand component 640. In other embodiments, a greater number of components and modes are contemplated.

In this example, if chest component 520 is selected, in response to the arrow keys, different components can be selected. For example, if the right arrow key is pressed, right shoulder component 560 is selected, if the left arrow key is pressed, left shoulder component 550 is selected, if the up arrow key is pressed, neck component 580 is selected, and if the down arrow key is pressed, torso component 530 is selected. As shown, from each component or mode, navigation may lead to selection of another component or mode.

As illustrated in the present example, to navigate from left shoulder component 560 to right shoulder component 570, only a single navigation key (e.g. left arrow or right arrow) is pressed. This is in contrast to the example in FIG. 1 where the shoulders are only coupled via a chest component. Additionally, as illustrated, to navigate from right hand component 630 to left hand component 640, a user presses a single left or right arrow key. In contrast to the example in FIG. 1, the user has to follow hierarchy 100 up the right arm back to the chest and back down the left arm.

As can be seen, the method disclosed in FIG. 1 is very inefficient compared to the present embodiments. The inventors of the present invention have seen embodiments of the present invention increase efficiency of users (e.g. animators, shaders) from four to five times over conventional techniques.

In some embodiments, particular navigation commands do not select different components. For example, from torso component 530, in this example, if the left or right arrow key are pressed, the selection remains on torso component 530.

In additional embodiments, navigation from one component may lead to selection of other physical components. For example, starting from head component 590, if the up arrow is pressed, eye tracking mode 620 is entered. In this example, right eye component 610 and left eye component 600 are both selected. Subsequently, when the system enters a translation manipulation mode, the eye components track a key point defined (e.g. graphically) by the user, i.e. they point to a set point in space.

In other examples, navigating to other types of manipulation components are also contemplated. In various embodiments, navigating to manipulation components may cause the system to automatically select the physical components required for further manipulation. In other embodiments, the system may also automatically enter a manipulation mode, such as an "integrated squash and stretch with volume preservation" manipulation mode, and the like.

In other examples, navigating to specific components in the object hierarchy may be performed in response to a navigation command. For example, if a hand component is selected, an "ALT-down arrow" key command is input, the hand components remain selected, and the hand components curl-up in a fist via setting of the avars associated with the hand components; further, if the hand component is selected and an "ALT-up arrow" key command is input, the hand components remain selected, and the hand components return the hand to the previous position via restoration of the avars associated with the hand components. In still other examples, particular navigation commands may make certain components invisible or visible, or the like. Many other types of manipulation modes are contemplated.

Many changes or modifications are readily envisioned. In light of the above disclosure, one of ordinary skill in the art would recognize that any number of different object hierarchies may be implemented that specify different connection between object components than a geometric hierarchy. For example, a hierarchy may be specified for use in animation, for lighting, for rendering, and the like Additionally, the object hierarchies may include any number of non-component selections, such as entering a manipulation mode, and the like.

In embodiments of the present invention, techniques may be implemented in any number of object system, such as an animation environment, object creation environment, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for facilitating the selection of geometric components in a geometric model, the method comprising:
   storing a hierarchy for a geometric model, wherein the geometric model comprises a plurality of geometric components, and wherein the hierarchy describes hierarchical connections between one or more geometric components in the plurality of geometric components;
   storing a selection network for the geometric model, wherein the selection network is independent of the hierarchy, and wherein the selection network includes, for each geometric component in the one or more geometric components, one or more mappings between user input signals and other geometric components;
   receiving a first user input signal;
   in response to the first user input signal, indicating a first geometric component in the one or more geometric components as being selected on a display;
   receiving a second user input signal while the first geometric component is indicated as being selected; and
   in response to the second user input signal:
      determining, based on the selection network, a mapping associated with the first geometric component, wherein the mapping is between the second user input signal and a second geometric component in the one or more geometric components; and
      indicating the second geometric component as being selected on the display.

2. The method of claim 1 wherein the second user input signal is selected from a group consisting of: a button selection of a user input device, a key selection of a keyboard, and a voice input.

3. The method of claim 1
   wherein the first geometric component comprises an object on a left-geometric side of the geometric model, and
   wherein the second geometric component comprises an object on a right-geometric side of the geometric model.

4. The method of claim 1
   wherein the first geometric component is coupled to the second geometric component only via a third geometric component in the geometric model.

5. The method of claim 1 further comprising:
   receiving a third user input signal while the second geometric component is indicated as being selected; and
   entering a manipulation mode for the second geometric component in response to the third user input signal.

6. The method of claim 1
   wherein the selection network comprises a selection state machine; and
   wherein the selection state machine is responsive to the second user input signal.

7. The method of claim 6 wherein the second user input signal is selected from a group consisting of: up arrow, down arrow, right arrow, left arrow, shift-up arrow, shift-down arrow, shift-right arrow, and shift-left arrow.

8. A computer system comprising:
   a memory configured to:
      store a hierarchy for a geometric model, wherein the geometric model comprises a plurality of geometric components, and wherein the hierarchy describes hierarchical connections between one or more geometric components in the plurality of geometric components; and
      store a selection network for the geometric model, wherein the selection network is independent of the hierarchy, and wherein the selection network includes, for each geometric component in the one or more geometric components, one or more mappings between user input signals and other geometric components; and
   a processor coupled to the memory, wherein the processor is configured to:
      receive a first user input signal;
      in response to the first user input signal, indicate a first geometric component in the one or more geometric components as being selected on a display;
      receive a second user input signal while the first geometric component is indicated as being selected; and
      in response to the second user input signal:

determine, based on the selection network, a mapping associated with the first geometric component, wherein the mapping is between the second user input signal and a second geometric component in the one or more geometric components; and indicate the second geometric component as being selected on the display.

9. The computer system of claim 8 wherein the second user input signal is generated by depressing a key on a keyboard, depressing a button on a user input device, speaking a command, or rotating a knob on a user input device.

10. The computer system of claim 8 wherein the hierarchy specifies that the first geometric component and the second geometric components are coupled via a third geometric component;

wherein the third geometric component is an ancestor component of the first geometric component and of the second geometric component; and wherein navigating from the first geometric component to the second geometric component within the hierarchy requires navigating via the third geometric component.

11. The computer system of claim 8 wherein the first geometric component and the second geometric component are related in a manner selected from a group consisting of: similar geometric component, and mirror-image geometric component.

12. The computer system of claim 11 wherein the first geometric component and the second geometric component are symmetrically located on the geometric model.

13. A tangible medium for a computer system, the tangible medium having stored thereon a series of instructions which, when executed by a processing component, cause the processing component to facilitate the selection of geometric components in a geometric model by:

storing a hierarchy for a geometric model, wherein the geometric model comprises a plurality of geometric components, and wherein the hierarchy describes hierarchical connections between one or more geometric components in the plurality of geometric components;

storing a selection network for the geometric model, wherein the selection network is independent of the hierarchy, and wherein the selection network includes, for each geometric component in the one or more geometric components, one or more mappings between user input signals and other geometric components;

receiving a first user input signal;

in response to the first user input signal, indicating a first geometric component in the one or more geometric components as being selected on a display;

receiving a second user input signal while the first geometric component is indicated as being selected; and in response to the second user input signal:

determine, based on the selection network, a mapping associated with the first geometric component, wherein the mapping is between the second user input signal and a second geometric component in the one or more geometric components; and indicating the second geometric component as being selected on the display.

14. The machine readable tangible medium of claim 13 wherein the hierarchy is specified by a first user; and wherein the selection network is specified by a second user different from the first user.

15. The tangible medium of claim 13 wherein the second user input signal is selected from a group consisting of: key stroke on a keyboard, pressing of a button on a user input device, and speaking a command.

16. The tangible medium of claim 15 wherein the second user input signal includes modifier keys selected from a group consisting of: shift, control, and alt.

17. The tangible medium of claim 13 wherein the first geometric component is coupled to a first surface of the geometric model;

wherein the second geometric component is coupled to a second surface of the geometric model; and wherein the first surface and the second surface have a geometric relationship on the geometric model selected from a group consisting of: top / bottom, right / left, front / back, and inside / outside.

18. The tangible medium of claim 13 wherein the series of instructions further cause the processing component to:

receive a third user input signal while the second geometric component is indicated as being selected; and enter a manipulation mode for the second geometric component in response to the third user input signal.

* * * * *